United States Patent
Cairns et al.

(10) Patent No.: US 6,464,405 B2
(45) Date of Patent: *Oct. 15, 2002

(54) WET-MATEABLE ELECTRO-OPTICAL CONNECTOR

(75) Inventors: James L. Cairns; Stewart M. Barlow; Peter R. Baxter, all of Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/761,917

(22) Filed: Jan. 17, 2001

(65) Prior Publication Data

US 2002/0003931 A1 Jan. 10, 2002

Related U.S. Application Data (63) Continuation-in-part of application No. 09/418,145, filed on Oct. 14, 1999.

(51) Int. Cl.[7] .................................................. G02B 6/38
(52) U.S. Cl. ............................ 385/56; 385/58; 385/75; 385/139; 439/131; 439/141
(58) Field of Search .............................. 385/53, 55, 56, 385/58, 60, 70–72, 75, 94, 139; 439/131, 141

(56) References Cited

U.S. PATENT DOCUMENTS

| | | | | |
|---|---|---|---|---|
| 4,085,993 A | * | 4/1978 | Cairns | 439/201 |
| 4,373,767 A | * | 2/1983 | Cairns | 439/275 |
| 4,411,491 A | | 10/1983 | Larkin | |
| 4,606,603 A | * | 8/1986 | Cairns | 385/58 |
| 4,616,900 A | * | 10/1986 | Cairns | 385/73 |
| 4,666,242 A | * | 5/1987 | Cairns | 385/75 |
| 4,795,359 A | * | 1/1989 | Alcock | 439/271 |
| 4,887,883 A | | 12/1989 | Darbut et al. | |
| 4,948,377 A | * | 8/1990 | Cairns | 439/200 |
| 5,125,055 A | * | 6/1992 | Hughes et al. | 385/59 |
| 5,171,158 A | * | 12/1992 | Cairns | 439/199 |
| 5,194,012 A | * | 3/1993 | Cairns | 439/201 |
| 5,203,805 A | * | 4/1993 | Cairns | 439/199 |
| 5,686,727 A | * | 11/1997 | Cairns | 439/139 |
| 5,738,535 A | * | 4/1998 | Cairns | 439/138 |

FOREIGN PATENT DOCUMENTS

WO    WO 86/02173    4/1986

* cited by examiner

Primary Examiner—John D. Lee
Assistant Examiner—Sarah N Song
(74) Attorney, Agent, or Firm—Brown, Martin, Haller & McClain, LLP

(57) ABSTRACT

An underwater connector has a plug and a receptacle unit each having an internal chamber in which a respective contact module is located. Each module has an end face having contacts for engagement with corresponding contacts on the other module when the units are releasably mated together. Each chamber has a resilient forward end with an opening communicating with the respective chamber, and an actuator in each unit compresses the forward end to seal the opening when the units are unmated. As the units are mated, the actuator in one unit is urged rearwardly and the forward end of the chamber in the other unit is urged rearwardly, such that each end opens to permit the module of one unit to pass into the chamber of the other unit, and into engagement with the other module so that all contacts are engaged for communication between the units.

26 Claims, 8 Drawing Sheets

WET-MATEABLE ELECTRO-OPTICAL CONNECTOR

CROSS-REFERENCES TO RELATED APPLICATIONS

This application is a Continuation-In-Part of application Ser. No. 09/418,145 filed Oct. 14, 1999.

BACKGROUND OF THE INVENTION

This invention relates to a connector for making connections of fiber-optic, electrical, and hybrid electro-optical cables in a hostile or underwater, high pressure environment.

There are many types of connectors for making electrical and fiber-optic cable connections in hostile or harsh environments, such as undersea connectors which can be repeatedly mated and demated underwater at great ocean depths. Such underwater connectors typically comprise a plug unit containing one or more contact probes and a receptacle unit containing an equivalent number of contacts or junctions for engagement with the contact probes, which extend into the receptacle unit when the units are connected together. Typically, the contacts or junctions are contained in a sealed chamber containing optically clear dielectric fluid, and the probes enter the container via one or more openings which are sealed when the units are separated. One major problem in designing such units is the provision of seals which will adequately exclude seawater and other contamination from the contact member even after repeated mating and demating, and also prevent fill fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. On mating, the contact probe is forced through the opening and the sphincter pinches against the probe to form a seal. Although this type of seal is successful in some cases, it does have disadvantages. One disadvantage is that this seal does not work well under all hostile conditions. Another disadvantage is that such seals tend to lose their "memory" after repeated mating and demating, so that they may fail to close completely, or may not close quickly enough to isolate the chamber from the surrounding environment when the units are demated. Another type of known seal mechanism comprises a piston which moves axially into the seal opening as the units are demated.

In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and demating.

Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described for example, in U.S. Pat. Nos. 5,685,727 and 5,738,535 of Cairns. These overcome some of the reliability problems of penetrable seals for example, but can be too complex for miniaturized connectors.

SUMMARY OF THE INVENTION

It is an object of the present invention to provide a new and improved connector for making connections between optical fiber cables, electrical cables, or hybrid electro-optical cables in hostile environments, such as underwater.

According to the present invention, an underwater connector is provided which comprises a plug unit having a forward end, a rear end, and a hollow body, a first member mounted in the hollow body and forming an internal chamber, the member having a resilient forward end portion having an opening communicating with the internal chamber, at least one probe contact member mounted in the chamber in alignment with the opening, a receptacle unit having a hollow body, a forward end, and a rear end and adapted for releasable mating engagement with the plug unit, a second member mounted in the hollow body of the receptacle unit and having an internal chamber and a resilient forward end portion having an opening communicating with the internal chamber, and at least one receptacle contact member in the chamber in alignment with the opening, the resilient forward end portions of the first and second members having forward end faces in face-to-face sealing engagement when the units are mated together, the plug and receptacle units each having an actuator acting in a seal closing direction for compressing the resilient end portion of the respective member to close and seal the respective opening when the units are unmated, and for opening the openings when the plug and receptacle units are mated together with the end faces in sealing engagement, whereby at least one of the probe and receptacle contact members can pass through the aligned openings in the resilient end portions of the members to engage the other contact member, the openings in the resilient end portions each having a cross section which is elongated in a direction transverse to the closing direction.

In an exemplary embodiment of the invention, the actuator is designed to act in a seal opening direction to force the member openings to open when the end faces are in sealing engagement. In one embodiment, the actuator has a shaped throat designed such that the resilient end portions of the members are constricted in the seal closing direction when the units are mated, forming an elongated shape with a slit-like closure. When the units are connected together, the members travel through the actuator throats into a position in which they are compressed in a perpendicular, seal opening direction, forcing the openings to open. The actuator throat may be of gradually tapering, oval shape in order to compress the resilient end portions and close the openings, with an adjacent region of circular cross section which will compress the outer ends of the elongated end portions and force them back into a circular shape, forcing the openings back into an open configuration. By elongating the seal opening in a direction transverse to the seal closing direction, it can more readily be compressed into a slit-like shape without bunching up of excess material at the ends of the slit. Such bunching up can be a problem since the seal end face will then no longer be flat and smooth. In an exemplary embodiment, the openings are generally eye-shaped, with pointed opposite ends.

Preferably, one of the actuators is slidably mounted in the respective body of a first one of the plug and receptacle units and movable between an extended position in which the tapered throat engages the respective member end portion to squeeze the opening shut, and a retracted position in which the throat is pushed back over the end portion and the adjacent portion forces the opening to open. The member in the other, second unit is also slidably mounted for movement between an extended position in which the resilient end portion is engaged in the actuator throat and the opening is squeezed shut, and a retracted position in which the resilient end portion is retracted from the actuator throat and forced to open by an adjacent, circular part of the actuator. In operation, the end of the second unit engages the slidable actuator in the first unit to push it back as the two units are secured together. At the same time, the end of the member in first unit engages the end of the retractable member in the second unit, pushing it back into the retracted position so that both member openings are forced open. The contact element in the second unit travels through the open ends of the members to contact the corresponding contact element in the first unit.

In one embodiment of the invention, each actuator has a through bore having a forward end, and an inwardly tapering throat portion extending up to the forward end to squeeze the opening of the resilient end portion of the respective first or second member into the sealed and closed condition. The throat portion is preferably of oval, tapering cross-section up the forward end, and has opposing flat sides for squeezing the respective opening into a slit-like closure. The throat portion on one unit may be formed integrally or secured in the hollow body of the unit, while the other unit has a separate throat member slidably mounted in the body and automatically moved into the extended position when the plug and receptacle units are separated. Instead of forming the actuator as an inwardly tapered, oval bore or throat, alternative actuator mechanisms such as leaf springs or the like may be provided for squeezing the openings shut.

The connector may be a single circuit connector with a single contact probe on one side for contact with a single contact on the other side, or may be a multiple contact connector with electrical, optical, or both electrical and optical contacts to form a hybrid eletro-optical connector. In the latter case, both the plug and receptacle units may have multiple members forming chambers for the respective contact elements, and actuators for squeezing the end portions of the respective members closed when the units are disconnected. Alternatively, multiple circuits could be grouped within one member which is opened and closed by a single actuator. In an exemplary embodiment, both electrical and optical contacts may be mounted in the same oil filled chamber of the first and second members.

In an exemplary embodiment of the invention, the plug and receptacle units each contain a base module which extends into the respective chamber and on which a set of electrical contacts and an optical contact unit are mounted. The chamber is oil-filled so that the contact faces are always immersed in oil. The optical contact units may each comprise a ferrule housing in which a plurality of optical fibers are terminated, each housing having an end face with plural optical contacts for engagement with corresponding contacts on a mating end face of the other housing when the plug and receptacle units are connected together. This arrangement allows more electrical power to be transmitted and also permits a larger number of optical fibers to be connected via a relatively small connector package.

The connector apparatus of this invention is suitable for various undersea applications, such as connection of undersea telecommunications cables, oceanography research applications, submarine systems, and the offshore oil and gas industry. The invention avoids the need for complex rolling seal or stopper arrangements for sealing the connector, and is of much simpler construction than previous underwater connectors. All that is required in this invention to seal all of the contacts is a simple opening in a resilient end portion of a contact chamber, which is pinched closed in one position, and pushed away from the pinching device and forced open in a second position.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DETAILED DESCRIPTION OF THE DRAWINGS

FIGS. 1 to 15 of the drawings illustrate a wet-mateable electro-optical connector according to an exemplary embodiment of the present invention, which is particularly designed for use in subsea environments. The connector is suitable for various applications, including subsea telecommunications, oceanography research applications, submarine systems, and the offshore oil and gas industry. The connector may also be used in other harsh environments such as splash zones or other volatile or corrosive environments, since the optical and electrical contacts remain sealed in an oil-filled chamber at all times.

The illustrated connector can connect multiple electrical and optical circuits, and has higher capacity than prior art underwater connectors. It may be designed to connect any desired number of optical and electrical circuits. However, in alternative embodiments, it may be designed to connect only optical or only electrical circuits.

Figures 1, 2, 13:
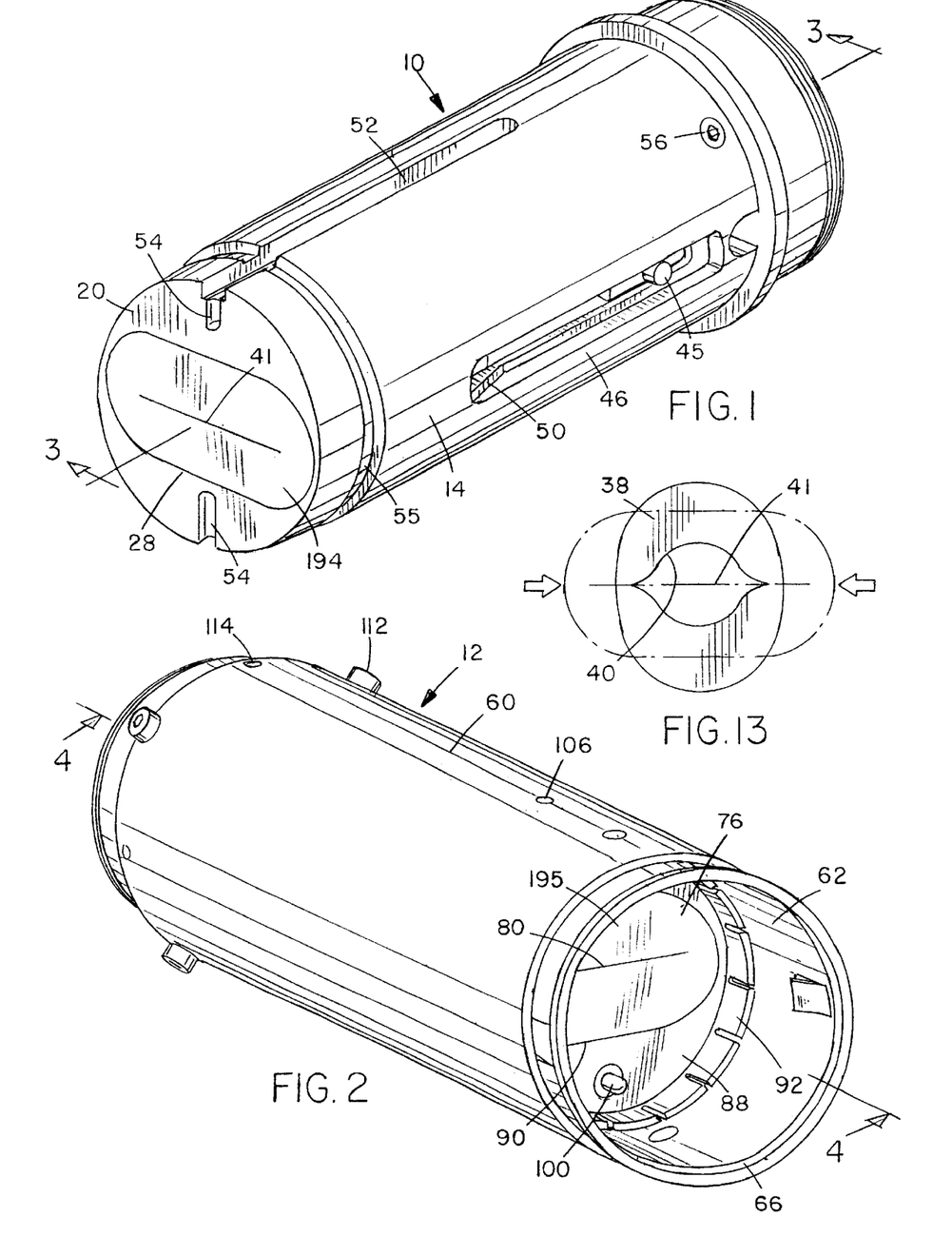
FIG. 1 is a perspective view of the receptacle component of the connector according to an exemplary embodiment of the invention.
FIG. 2 is a perspective view of the plug component of the connector of FIG. 1.
FIG. 13 is a front end view of the receptacle unit illustrating the end seal in the open position of FIG. 5, with the closed position illustrated in dotted outline.
Figure 3:
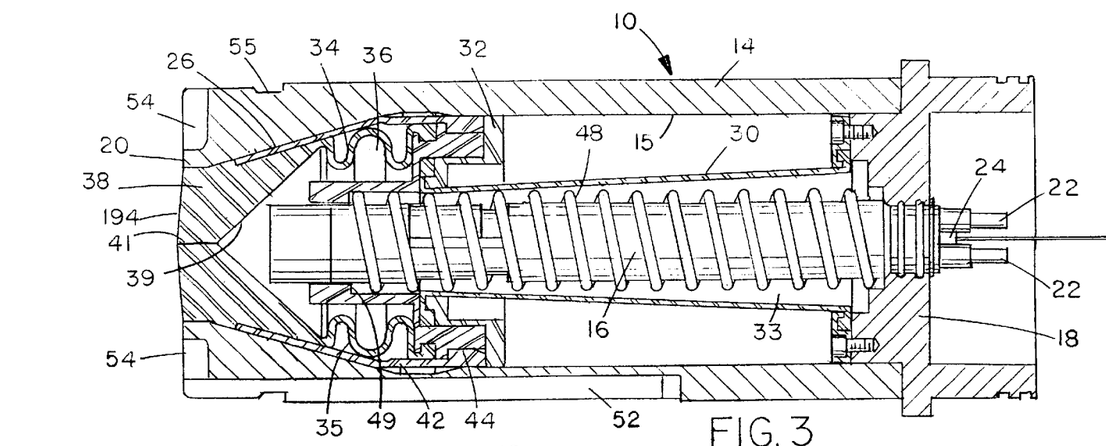
FIG. 3 is a sectional view taken on line 3—3 of FIG. 1.
Figure 4:
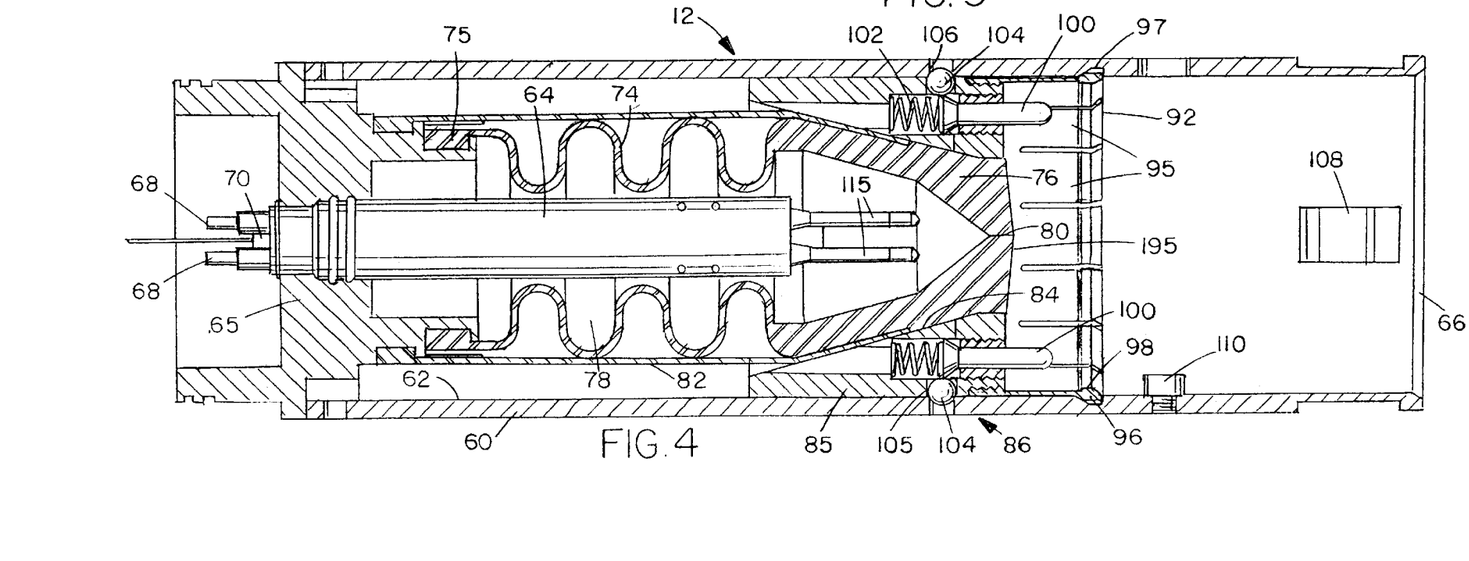
FIG. 4 is a sectional view taken on line 4—4 of FIG. 2.

The connector basically comprises a receptacle unit 10 as illustrated in FIGS. 1 and 3, and a plug unit 12 as illustrated in FIGS. 2 and 4, which are designed to be releasably connected together as illustrated in FIGS. 5 to 9. FIGS. 10 to 12 illustrate the core members of the two units 10 and 12 which carry the various electrical and optical contacts, as will be explained in more detail below.

The receptacle unit will first be described in more detail with reference to FIGS. 1, 3 and 6. Unit 10 basically comprises an outer cylindrical shell 14 having a bore 15 in which a core module or element 16 is mounted to extend from rear end wall 18 towards the front end face 20 of shell 14. The core module 16 is fixed to the rear end wall and houses the electrical and optical contacts as well as the conductive leads and fibers extending from the contacts through the module to the rear end 25 of module 16, as will be described in more detail below with reference to FIGS. 10 and 14. Electrical terminals 22 and an optical fiber feed through 24 to the module are provided at the rear end, as illustrated in FIG. 3.

The forward end of bore 15 is shaped to form a tapered throat portion 26 extending up to an oval opening 28 in the front end face of the shell. The shape of the tapered throat portion is identical to that described in co-pending application Ser. No. 09/418,145, the contents of which are incorporated herein by reference.

A first bladder or resilient sleeve member 30 has a rear end secured to the rear end wall 18 and projects forwardly over module 16 with its forward end secured in a sliding seat 32 slidably mounted in receptacle bore 15. Sleeve member 30 defines a first oil-filled chamber 33 within the receptacle bore 15. A second bladder or resilient sleeve member 34 has a rear end secured to the sliding seat 32, a flexible bellows portion 35 which is relatively thin-walled and forms a second oil-filled chamber 36, and a relatively thick walled, resilient, cylindrical end portion 38 located in the throat portion 26 of the shell in the advanced position illustrated in FIG. 3. The end portion 38 has a through bore 39 communicating at one end with the chamber 36, and forming a sealable opening 40 at the opposite end. Opening 40 is of generally elongated, eye-like shape when fully open as illustrated in solid outline in FIG. 13. The opening is squeezed shut by the throat portion 26 of the shell when in the extended position illustrated in FIG. 1, in which opposite portions of opening 40 are squeezed inwardly towards one another into face to face sealing engagement by the inwardly tapered shape of throat portion 26 to form a straight, sealed slit 41, as indicated in dotted outline in FIG. 13. Referring to FIG. 13, when the end portion 38 is within the oval opening 28 in the end face of the shell, it will be squeezed to form a corresponding oval shape as indicated in dotted outline in FIG. 13. If force is applied to opposite ends of the oval shape, as indicated by the arrows, the portion 38 is squeezed inwardly to adopt a more cylindrical shape, causing the opening 40 to open into the shape illustrated in the drawing.

An outer cylindrical sleeve or cover 42 is bonded at one end over the cylindrical end seal portion 38 of the bladder 34. The opposite end of cover 42 is snap-engaged in an annular outer groove 44 on the sliding seal member. The sleeve or cover 42 is of a material which is radially resilient but has axial strength to resist compression in an axial direction. One suitable material for sleeve 42 is Hytrel®, manufactured by DuPont Corporation, Wilmington, Del. Thus, the cylindrical end seal portion will be carried back and forth in the bore 15 of the receptacle shell by the sliding seat 32 as it moves between the extended position of FIG. 3 and the retracted position of FIG. 5.

Figure 8:
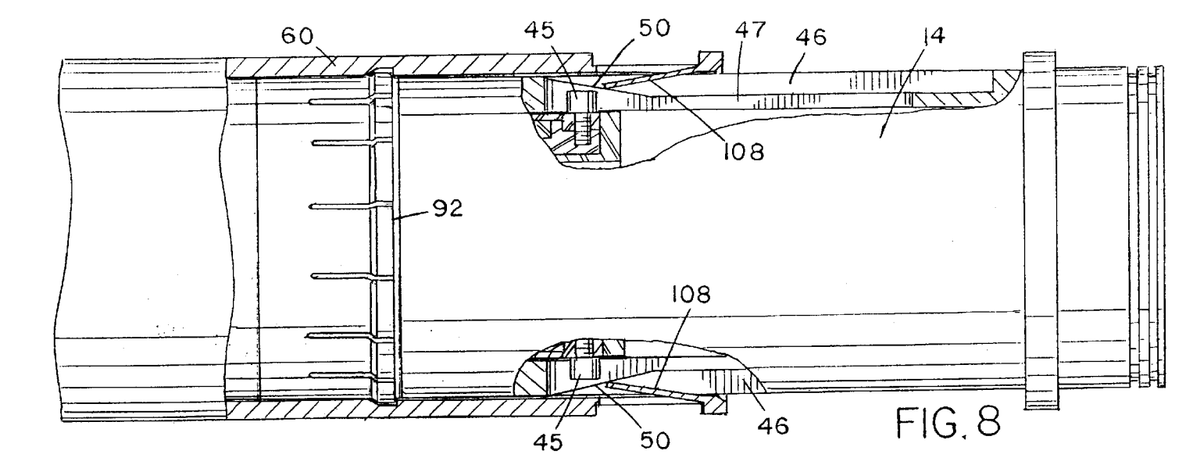
FIG. 8 is a top view of the structure of FIG. 6 with portions cut away.

The sliding seat 32 has a pair of diametrically opposed, radially projecting pins 45 which are slidably engaged in opposing, longitudinally extending slots 46 in base of a groove 47 in the outer shell 14. The sliding seat 32 is biased by biasing spring 48 which acts between the rear end wall of the shell and an annular inner shoulder 49 in the sliding seat. Since the sliding seat 32 carries the forward end of bladder 33, movement of seat 32 into the extended position will also extend the chamber within first bladder 33. Thus, spring 48 acts to hold out the bellows portion of bladder 33 in the extended position of FIG. 3. The alignment pins 45 will ensure that the end seal portion 38 of the bladder 34 is properly oriented relative to the throat portion 26 of the bore 15 when moving back into the extended position, such that the longitudinal axis of the opening 40 is parallel with the longitudinal axis of the elongate or oval front opening 28 of the slot, and force is applied by the gradually tapering throat in a direction transverse to the arrows in FIG. 13, so as to seal the opening 40 shut into the condition illustrated in FIGS. 1 and 3, as will be discussed in more detail below. Each slot 46 has a tapered lead-in or ramp 50 at its forward end, as best illustrated in FIGS. 1 and 8.

The receptacle shell also has a longitudinal keyway 52 extending from its forward end face 20, as best illustrated in FIG. 1. A pair of aligned elongate slots or indents 54 extend from the outer periphery of end face 20 partially across the end face on opposite sides of opening 28, in a direction transverse to the longitudinal axis of opening 28. The shell 15 also has an annular locking groove or indent 55 spaced rearwardly from the end face 20. A plurality of fill plugs 56 adjacent the rear end of the shell are connected with internal passageways (not illustrated) in the rear wall to allow oil to be supplied to bladder chambers 33 and 36.

The plug unit 12 will now be described in more detail with reference to FIGS. 2 and 4. Plug unit 12 basically comprises an outer cylindrical shell 60 having a bore 62 in which a core module or element 64 is mounted to extend from rear end wall 65 towards the open front end 66 of shell 60. The core module 64 is fixed to the rear end wall and houses the electrical and optical contacts as well as the conductive leads and fibers providing connection from electrical terminals 68 and optical fiber pass through 70 at the rear end 72 of module 60 to the respective contacts, as will be described in more detail below with reference to FIGS. 11 and 15. A resilient bladder 74 has a rear end 75 secured to rear end wall or base 65, and projects forwardly over the module 64, terminating in a cylindrical end seal portion 76 forming an oil-filled chamber 78 within which the module is sealed to protect the electrical and optical contacts.

The bladder has a thin-walled, bellows-like portion extending along most of its length for pressure compensation purposes. The forward seal portion 76 is relatively thick walled and has a forward end opening 80 which is of the same shape as the opening 40 in the receptacle seal portion 38 when open. An outer cylindrical protective sheath or cover 82 is secured over the bladder 74, and has an annular rib at its rear end secured in an annular groove in the rear end wall 65 of the shell. The forward end of the sheath is bonded over the cylindrical seal portion 76 of the bladder. As with sheath or sleeve 42 of the receptacle, the sheath 82 is of a material which is radially resilient but has axial strength to resist compression, and the material may be the same as that of sleeve 42.

The forward end portion 76 of the sleeve engages in a throat or through bore 84 in an actuator or throat member 85 which is slidably mounted in the plug shell bore 62 and which is releasably locked in the extended position illustrated in FIG. 4 by a ball locking assembly 86. The actuator 85 has a front end face 88 which is spaced rearwardly from the open front end 66 of the shell. The throat 84 has opposing tapered side portions which taper inwardly from the rear end to the front end face of the actuator, terminating in an oval opening 90 of identical shape to the opening 28 in the front end face of the receptacle shell. When the end seal portion 76 of the bladder is located in the actuator throat as in FIGS. 2 and 4, the tapered portions of the throat will compress opposing regions of the end portion inwardly to seal the opening 80 closed, forming a straight, sealed slit as indicated in FIG. 2.

A locking collet 92 is mounted on the forward end of the actuator 85 and projects forwardly from the actuator front end face for releasable engagement in the annular locking groove 55 of the receptacle shell when the two shells are mated together, as will be discussed in more detail below. The sleeve or collet 92 is a generally cylindrical member, having a series of inwardly directed slits extending from its forward end to define a series of spaced resilient fingers 95. The collet has an annular rib 96 at its outer end which engages in an annular groove 97 in the shell bore 62 in the position illustrated in FIG. 4. A corresponding, inwardly directed annular rib 98 at the outer end of the collet is designed for snap engagement in the locking groove 55 of the receptacle shell.

In the position illustrated in FIG. 4, the ball locking assembly 86 holds the sliding actuator in the advanced position and prevents axial or rotational movement of the actuator in the plug shell. The assembly 86 basically comprises a pair of ball actuator pins 100 which are slidably mounted in bores in actuator 85 so as to project outwardly from the front end face 88 of the actuator, as illustrated in FIGS. 2 and 4. The pins 100 are biased outwardly into the advanced position of FIGS. 2 and 4 by actuator lock springs 102 which act between the inner end of the respective actuator bore and the inner end of the respective pin, as indicated in FIG. 4. Each ball locking assembly 86 includes a latch ball 104 movably mounted in a radially inwardly extending bore 105 in the actuator which communicates with the axially extending bore in which the pin is mounted. Corresponding bores 106 in the plug shell 60 are aligned with the respective bores 105 in the actuator, and the balls project partially into the bores 106 when the pins are in the advanced position illustrated in FIG. 4, locking the actuator against rotation or axial sliding movement.

A pair of opposing, inwardly directed leaf springs 108 are provided in the plug shell adjacent the open forward end 66, as indicated in FIGS. 2, 4, 8 and 9. These are designed for engagement in the slots or axial grooves 46 in the receptacle shell behind alignment pins 45 of the sliding seat when the units are coupled together, as will be described in more detail below with reference to FIGS. 8 and 9. The leaf springs 108 avoid the need to have a return spring which is entirely responsible for the return of the sliding seat of the receptacle, making construction simpler and the return operation more reliable. The projecting forward end portion of the plug shell also has an inwardly directed key pin 110 designed for engagement in the keyway 52 of the receptacle shell for proper alignment as the units are connected. Mounting screws 112 adjacent the rear end of the shell are used to connect the rear end wall or base wall 65 to the open rear end of shell 60, and fill ports 114 are provided for filling the bladder chamber 78 with oil.

Figure 15:
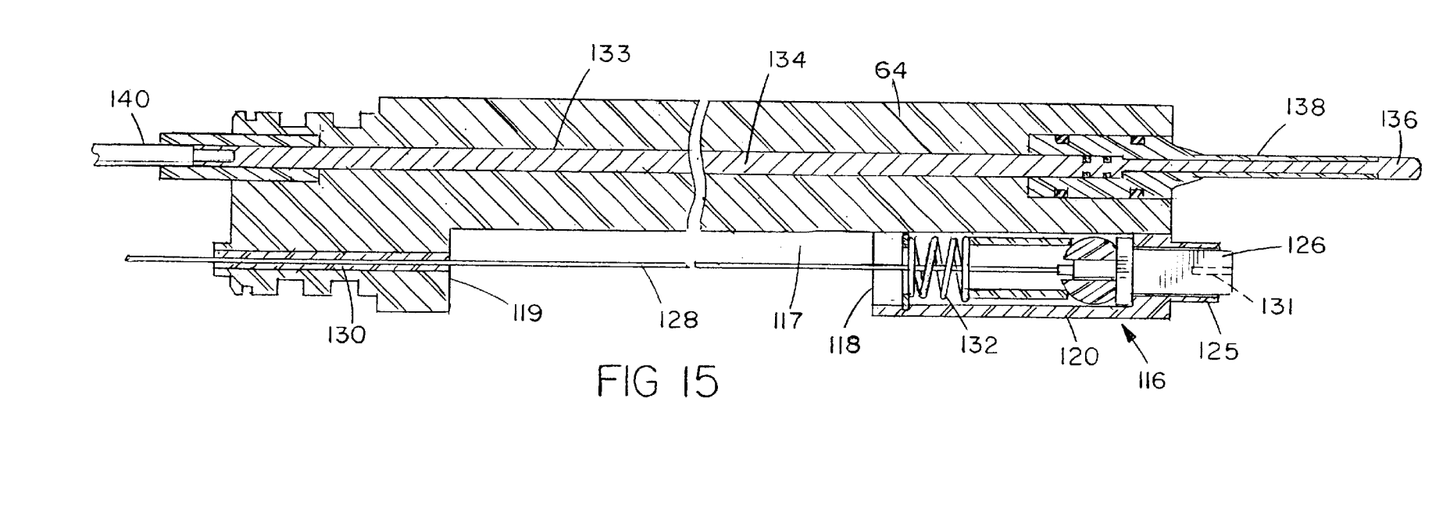
FIG. 15. is a sectional view of the core module of the plug unit, on lines 15—15 of FIG. 12.

The plug core module 64 is illustrated in more detail in FIGS. 10, 11 and 15 and is a single or unitary body, housing the conductive leads and optical fibers extending from the electrical terminals 68 and through optical fiber feed through 70 at the rear end of module 64 to the respective electrical contact probes 115 and optical contact assembly 116. The contact probes 115 project side by side and forwardly from the front end face of the module 64. Module 64 is a generally cylindrical, elongate member of high strength, strong plastic material such as PEEK® which has a semi-cylindrical cut-out 117 extending from its front end face rearwardly. Cut-out 117 has a flat, inner axial face 118 and a flat rear end face 119. A matching, generally semi-cylindrical optical ferrule seat 120 is secured in the front end of cut-out 117 via mounting screws 122, such that the forward end of the module is still of generally cylindrical shape, with a front face 124 aligned with the forward end of the module. Seat 120 has a generally rectangular portion 125 which projects forwardly from front face 124 and has a corresponding rectangular bore containing a multiple fiber or ribbon fiber optical ferrule 126 forming the female part of an optical fiber connector of a type available from various companies, such as AMP of Harrisburg, PA or FCI Berg of Etters, PA or of an optical connector assembly as described in my co-pending application entitled "Optical Fiber Connector Assembly" filed on even date herewith, the contents of which are incorporated herein by reference. An optical fiber bundle or ribbon fiber 128 extends from the rear end of the module 64 through an epoxy-filled bore 130, through the cut-out 117, and through the seat 120. The forward ends of the fibers in bundle 128 are epoxied into respective optical contact bores in the front end face of the ferrule 126 and modulated to form optical contact faces flush with the female end face . The front end face of the ferrule 126 also has a pair of alignment holes 131 for the mating ferrule, as described below.

The optical ferrule 126 is spring-loaded by spring 132 to ensure good optical contact between the contact faces in ferrule 126 and the optical contact faces in the receptacle unit ferrule when the units are mated together. The portion of the optical fiber bundle 128 extending through the cut-out 117 between the epoxy-filled bore 130 and the optical ferrule seat 120 is free and not constrained, and allows some free play in the fiber bundle so that it can bow slightly to permit a slight rearward movement of ferrule 126 as the parts are connected together, compressing spring 132 slightly.

The module 64 has two, axially extending, side-by-side bores 133 through which respective electrical contact shafts 134 project, each shaft 134 terminating at a conductive tip 136 at the forward end of the probe 112. Probe 112 has an outer protective shell 138 of dielectric material which extends from module 64 and terminates short of the conductive tip 136. A greater or lesser number of electrical contact probes may be provided in alternative embodiments. Each conductive shaft 134 is suitably connected to a conductive wire at the end of an electrical cable 140 at the rear end of the plug shell in a conventional manner.

The conductive tips 136 of the electrical contact probes 115 and the optical contact sockets of the ferrule 126 are all sealed in the single, oil-filled and pressure compensated chamber within the bladder 74 when the plug unit is unmated, as in FIG. 4. In the unmated condition, the front end opening 80 of the forward end seal portion 76 of the bladder is sealed shut by the throat 84 of the sliding actuator 85, which is held in position by the ball locking assembly 86.

Figure 14:
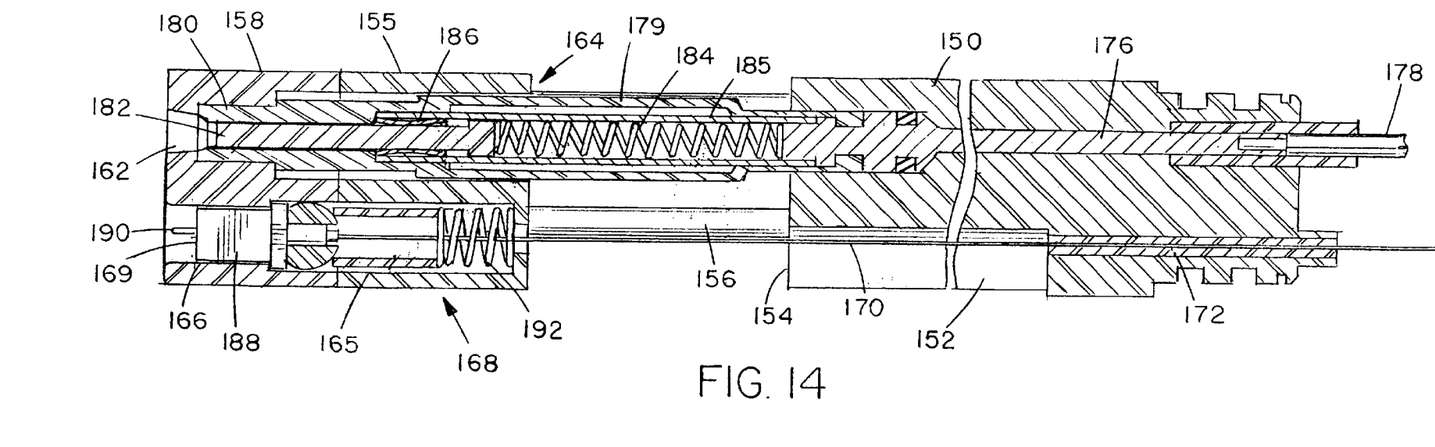
FIG. 14 is a sectional view of the core module of the receptacle unit on lines 14—14 of FIG. 10.

The receptacle contact or core module 16 will now be described in more detail with reference to FIGS. 10 and 14. Module 16 includes a cylindrical base portion 150 having a generally arcuate slot or cut-out 152 extending from its forward end 154 along the majority of its length, a cylindrical seat portion 155 axially aligned and spaced forwardly from the base portion 150 by spacer rods 156, and a cylindrical face plate portion 158 secured to seat portion 155 by mounting screws 160. A pair of aligned through bores 162 extend through the base, seat and face plate portions of the module, and an electrical socket assembly 164 is mounted to extend through each of the through bores 162. The seat portion 155 also has a through bore 165 aligned with the slot 152 and the face plate portion has a rectangular through bore 166. An optical ferrule assembly 168 mounted in the through bores 165 and 166 has optical contacts, in forward end face 169 formed at the ends of multiple optical fibers in a ribbon fiber 170 extending through an epoxy-filled bore 172 in base portion 150, slot 152, and into bore 165 in seat portion 155, and through the ferule.

Each electrical socket assembly extends through the aligned bores 162 in each of the module portions 150,155 and 158. A conductive member 176 projects from the rear end of the housing, where it is connected to an electrical wire in cable 178. A generally cylindrical bladder 179 of flexible, elastic nonconductive material extends forwardly from the rear end of the module over each conductive member. Each bladder 179 forms an electrical contact chamber within which an electrical socket structure is disposed. The bladder 179 has an enlarged, annular end seal 180 at the forward end of the respective housing, and the chamber within the bladder is filled with dielectric fluid of the type described in U.S. Pat. No. 5,645,442 of Cairns. A dielectric stopper 182 is slidably mounted in the bladder to project into the end seal 180, and is biased outwardly by a spring 184 which acts between the conductive member 176 and the stopper 182. A cylindrical conductive tube 185 extends forwardly from conductive member 176 within the bladder, terminating in an annular conductive contact band 186 slidably engaged over the dielectric stopper.

The optical contact or ferrule assembly 168 basically comprises a multiple fiber or ribbon fiber optical ferrule 188 forming the male part of an optical fiber connector of a type available from various companies, such as AMP or FCI Berg or of an optical connector assembly as described in my co-pending application entitled "Optical Fiber Connector Assembly" filed on even date herewith, the contents of which are incorporated herein by reference. The forward ends of the fibers in bundle or ribbon 170 form to respective optical contact faces in the front end face of the ferrule 188.

The front end face of the ferrule 188 also has a pair of alignment posts 190 for engagement in the alignment holes 131 of the mating female ferrule, as described below.

The optical ferrule 188 is spring-loaded by a spring 192 to ensure good optical contact between the contact faces in ferrule 188 and the contact faces in ferrule 126 when the units are mated together. The portion of the optical fiber ribbon or bundle 170 extending through the slot 152 in the base portion and the space between the base portion and seat portion 155 between the epoxy-filled bore 172 and the optical ferrule is free and not constrained, and allows some free play in the fiber bundle so that it can bow slightly to permit a slight rearward movement of ferrule as the parts are connected together, compressing spring 192 slightly. The mating male and female ferrules preferably each have matching, slightly angled end faces for mating engagement as the units are mated together.

The optical connector assembly of this embodiment therefore has optical and electrical contacts mounted in a single basic module in each of the receptacle and plug units, and sealed in a single, oil-filled bladder, rather than requiring completely separate seals and chambers for the electrical and optical contacts as in the prior art. The optical ferrule assemblies allow a plurality of fibers in two optical cables to be releasably mated together. Each fiber ribbon may contain up to forty eight separate optical fibers, providing much greater capacity than prior art underwater optical connectors. The electrical probe and socket assemblies and the optical contact assemblies are designed to allow more electrical power and a larger number of optical fibers to be connected in a smaller overall package than was previously possible.

The mating sequence of the plug and receptacle units will now be described in more detail, with reference to FIGS. 3 to 9 and 13. The plug and receptacle units 10,12 are shown separate and in unmated condition in FIGS. 3 and 4. In this condition, each chamber 33,78 containing the optical and electrical contacts is sealed and the forward end seal portion 38,76 of the respective bladder is squeezed shut by the inwardly tapering wall portions of the fixed throat 26 in the receptacle and the throat 84 in the slidable actuator 85. The opposing surfaces of the oval forward end openings 40,80 are therefore pressed against one another to form a straight line seal 41. The front end faces 194,195 of the respective forward end seal portions 38,76 are preferably slightly convex or bulged outwardly, as illustrated in FIGS. 3 and 4.

As the units are brought together, the front end of the receptacle shell 14 will first engage in the open forward end 66 of the plug shell 60. The key pin 110 in the forward end portion of the bore 62 must be aligned with the keyway 52 on the receptacle shell for the units to be mated, ensuring that the front end faces 20 and 88 of the receptacle shell and plug actuator 85 are properly aligned. The key pin 110 will then engage in keyway 52, and at the same time, the leaf springs 108 will be urged outwardly to travel over the outer surface of shell 14. As the front end faces 194,195 of the end seal portions of the two units are brought into face-to-face engagement, the ball actuator pins 100 will engage in slots 54 on the front face of the receptacle, and the rib 98 of the locking collet 92 will engage in the annular locking indent 55 on the receptacle shell, as indicated in FIG. 6. As the receptacle unit is forced inwardly, the slots 54 on the front face of the receptacle shell will bear against the ball actuator pins 100, urging them inwardly to compress springs 102 until the larger, rear end portions 196 of the pins 100 are spaced inwardly from the ball retaining bores 105 in the actuator, allowing the balls 104 to drop inwardly from the shell bores 106, as indicated in FIG. 6. This releases the actuator 85 so that it is free to slide axially inwardly into the plug shell, while at the same time the pins 100 engaging in slots 54 will prevent relative rotational movement between the actuator 85 and the receptacle shell.

Figure 6:
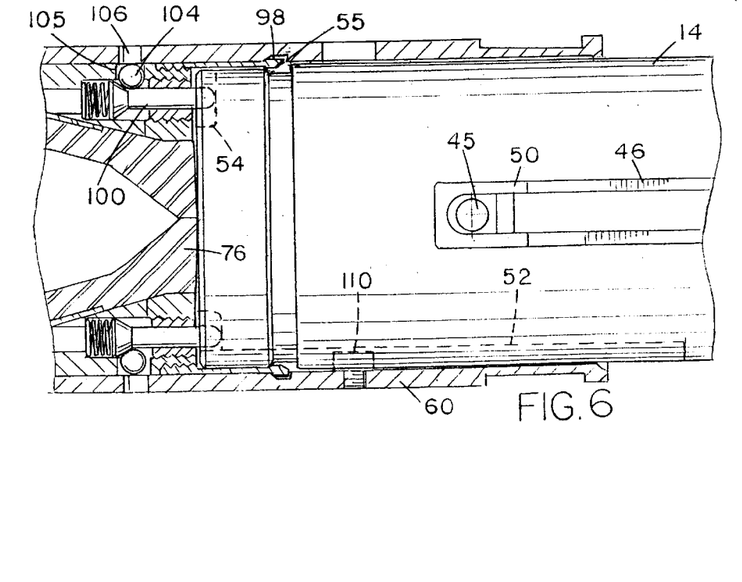
FIG. 6 is a top view of FIG. 5 with portions cut away and showing the initial connection of the two portions.
Figure 7:
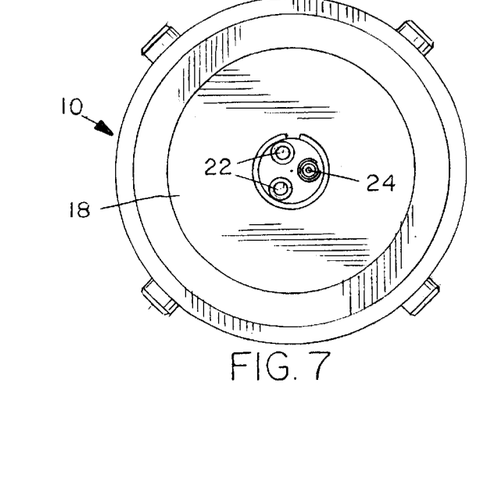
FIG. 7 is a right hand end view of FIG. 5.

As the receptacle unit is urged further inwardly from the position illustrated in FIG. 6, the leaf springs 108 will snap into the respective opposing axial slots 46 in the receptacle shell behind the alignment pins 45 of the slidable actuator 85, as illustrated in FIG. 8. At the same time, the face-to-face engagement between the forward end faces of the end seal portions 38 and 76 will form a seal, and the forward end 20 of the receptacle shell will push the actuator 85 inwardly. At the same time, the forward end portion 76 of the bladder 74, which is held outwardly in the advanced position by the axially rigid outer sheath 82, will push the forward end portion 38 of bladder 34 inwardly, compressing bladder 30 and internal spring 48. As this inward motion of the receptacle shell continues, the locking collet 92 will be forced out of groove 97 and inwardly into the plug shell bore 62, which will act to lock the rib 98 in the locking indent 55 in the receptacle shell and hold the end faces of the sealing end portions in sealing engagement during mating.

At the same time, the throat of the sliding actuator 85 will slide inwardly into the plug shell over the forward end portion 76 of bladder 74, and both of the forward end portions 38 and 76 will slide completely through the throat portion 26 at the front end of the receptacle shell, and into a cylindrical portion of the shell bore 15 to the rear of throat portion 26. The diameter of bore 15 is less than the axial length of the end portions 38 and 76 when compressed into the elongated shape illustrated in dotted outline in FIG. 13, such that the bore 15 will act to urge opposite ends of the end portions 38 and 76 inwardly in the direction of the arrows in FIG. 13, causing each end portion to adopt the cylindrical shape illustrated in solid line in FIG. 13, and forcing the respective end openings 80 and 40 to open into the eye-shaped configuration of FIG. 13. The mating forward end portions of each of the bladders will also slide rearwardly over the fixed core module 16 in the receptacle unit, into the position illustrated in FIG. 5, in which the core modules 16 and 64 are brought into mating engagement. In this position, the electrical contact probes 115 enter the forward end openings of the end seals 180 of the receptacle socket assemblies, urging the stoppers 182 inwardly so that the conductive tips 136 are in electrical contact with the contact bands 186, establishing electrical connection between the plug and receptacle units.

Figure 5:
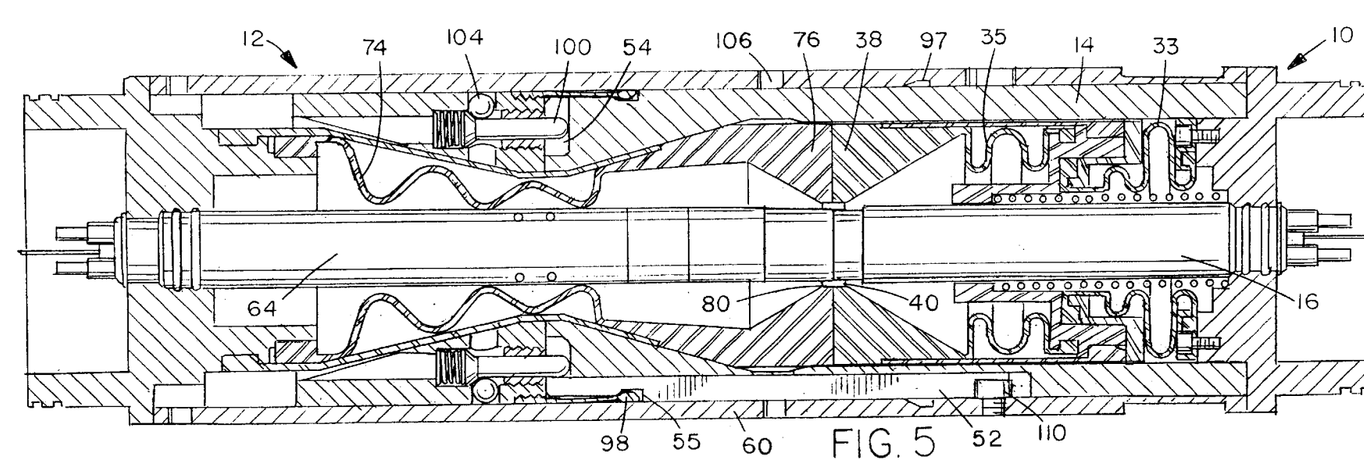
FIG. 5 is a sectional view showing the structure of FIGS. 3 and 4 connected.

At the same time, the male and female optical ferrules 188 and 126 will also be brought into mating engagement, with ferrule 126 entering bore 166 at the front end of the receptacle module 16 and the alignment posts 190 on the male ferrule 188 entering the alignment holes 131 in female ferrule 126. The optical contacts on the ferrule 188 will engage with the aligned optical contacts in the end face of ferrule 126, providing optical communication between all the fibers in ribbons 128 and 170.

Figure 9:
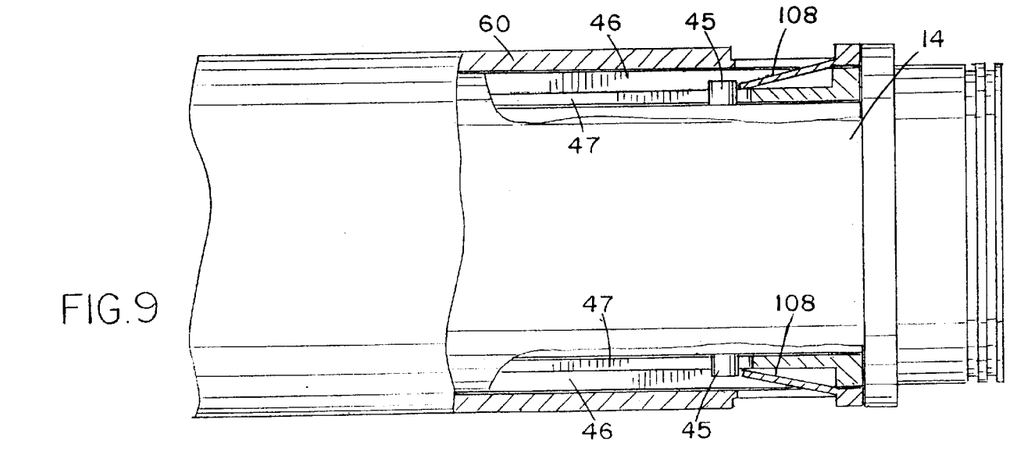
FIG. 9 is similar to FIG. 8 but showing the components fully connected.
Figures 10, 11, 12, 13A, 13B:
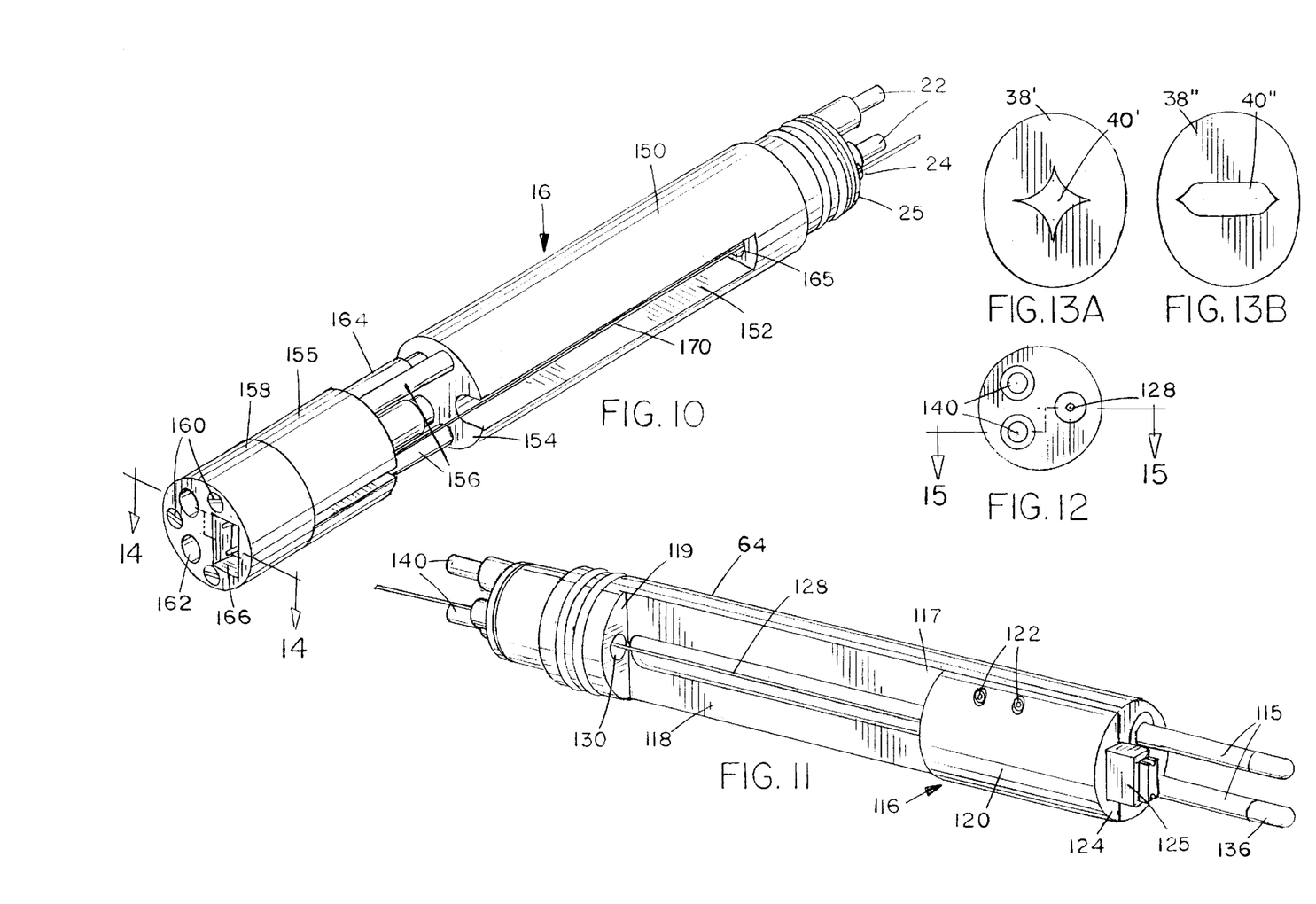
FIG. 10 is a perspective view of the core element of FIG. 3.
FIG. 11 is a perspective view of the core element of FIG. 4.
FIG. 12 is a left hand view of FIG. 11, the right hand end view of FIG. 10 being the reverse.
FIG. 13A illustrates an alternative end seal opening shape.
FIG. 13B illustrates another alternative end seal opening shape.

As the end portions of the seals are opening and the modules are coming into mating engagement, the leaf springs 108 will travel along the grooves 46 from the forward end to the rear end, as indicated in FIGS. 8 and 9, while the alignment pins on the sliding seat 32 will travel from the forward end to the rear end of slot 47. The springs 108 will therefore be positioned behind the respective pins. When the units are disconnected, the receptacle unit is pulled out of the plug shell, so that the springs 108 will move back along grooves 46 in the opposite direction, returning the bladder 30 to its extended position and also returning the end portion 38 of bladder 34 to the throat 26. This avoids the need for a large return spring in the receptacle bore. Instead, a smaller, lighter spring 48 only is used, which can be enclosed in the bladder chamber 33 so that it is constantly bathed in oil. Spring 48 is used only to hold out the bladder in the extended position, and to apply force so as to squeeze the end faces 195 and 196 together when the units are mated. The spring is axially guided by the core module 16. The angled ramps 50 at the forward ends of grooves 46 act to guide the leaf springs 108 upwardly out of the grooves 46 and away from the pins 45 after the seat has been returned to its extended position, reducing the risk of the springs 108 jamming in the grooves 46.

At the same time as the seat 32 is being returned to its extended position, the receptacle shell 14 is being withdrawn from the plug shell bore 62. Since the receptacle shell 14 is still coupled to the sliding actuator 85 in the plug unit by collet 92, it will also act to pull the actuator back outwardly to its advanced position over the end seal portion 76 of bladder 74. The receptacle core module 16 will also be retracted away from module 64, disconnecting the electrical and optical contacts in the two modules. As the throat of actuator 85 engages over end portion 76 and the end portion 38 of bladder 34 moves back outwardly into the throat 26 of the receptacle shell, the opposing tapered portions of the two throats will squeeze the end portions 38 and 76 back inwardly into the elongated, sealed shut condition of FIGS. 1 and 2, and as illustrated in dotted outline in FIG. 13. The eye-like shape of the openings 40 and 80 ensures that they can be squeezed shut more readily, without any bunching up of material which may occur if a round opening is squeezed shut in a similar, straight line manner, providing a better face to face seal between opposite side portions of the opening. Thus, as the module 16 is retracted back into the bladder chamber 36, the end portion 38 will be squeezed shut, as will the end portion 76 of bladder chamber 78.

As the end portions 38 and 78 are both sealed shut, the locking collet will reach the release groove 97 in the plug shell bore, allowing the collet to spring back out of the annular locking indent 55 of the receptacle shell so that the units can be separated. The locking collet ensures that the end faces 194 and 195 are held in face-to-face sealing engagement until their end openings are sealed shut, so that the electrical and optical contacts are always sealed in an oil-filled chamber. As the end faces are moved apart, the pins 100 of the ball locking assembly will be urged outwardly by springs 102, forcing the latch balls back up into bores 106 in the plug shell and locking the actuator 85 against any further movement. The end faces 194,195 are not flat, but are arranged with a suitable topography to provide the best sealing efficiency around the openings 40 and 80.

The leaf springs 108 on the plug shell provide a reliable, positive return for the sliding seat 32 and bladder 34, and will release the seat even if the internal spring 48 is jammed. At the same time, the collet 92 is coupled to the receptacle shell to force the plug actuator to return to its extended position, and avoiding the need for a large return spring in the plug shell, which could also potentially become jammed. This provides a much more reliable return action on demating.

Each of the throats 26 and 84 has a front end which is an oval opening having a perimeter length greater than or equal to the perimeter of the end seal portion 38,76 respectively, and a rear end which is of circular cross-section and has a diameter less than the distance across the oval opening. As noted above, the throats have opposing side portions which taper outwardly from the flat sides of the oval opening into the circular portion at the rear end of the throat. Thus, as a cylindrical end seal portion enters the rear end of the throat, opposite sides will be gradually compressed inwardly in a direction transverse to the arrows in FIG. 13, until the opening 40 or 80 is squeezed shut and the end portion adopts the same elongate oval shape as the end opening in the respective throat. Although the openings 40 and 80 are eye-shaped in the illustrated embodiment, other non-round shapes may alternatively be used which will also minimize or reduce internal stresses or bunching of the sealing end faces when sealed shut. Such alternative shapes include, for example, an elongate oval shape with rounded ends, an elongate slot-like shape with triangular or V-shaped ends, as illustrated in FIG. 13B, and a star-like shape with concave sides and four or more points, as illustrated in FIG. 13A.

FIGS. 16 to 19 of the drawings illustrate a modified plug unit 200 for connection with the receptacle unit 10 in another embodiment of a connector according to the invention. Some parts of the plug unit 200 are identical to those of the previous embodiment, and like reference numerals have been used for like parts as appropriate. Plug unit 200 basically comprises an outer cylindrical shell 60 in which a core module 64 is mounted to extend from a rear end wall or back shell 65 of the plug unit towards the open front end of shell 60, and a resilient bladder 202 also secured to the rear end wall 65 at its rear end and projecting forwardly in the shell 60 to form a chamber 204 in which the core module 64 is enclosed. The bladder 202 includes a thin walled, bellows portion 205 and a thicker walled, cylindrical end seal portion 206 having an eye-shaped end opening 208 which communicates with chamber 204 via passageway 210 through the portion 206.

Figures 16, 17:
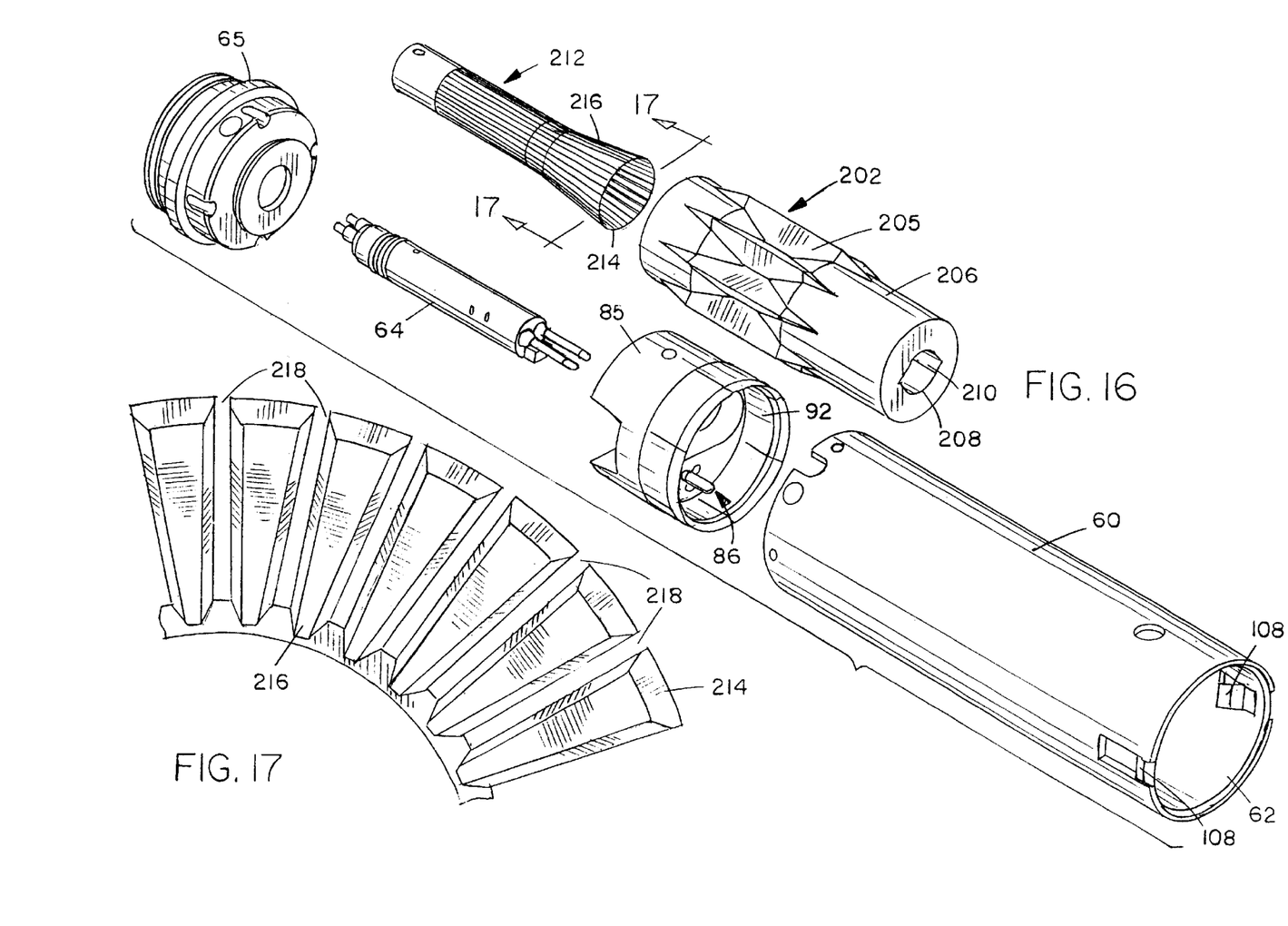
FIG. 16 is a perspective, exploded view of the parts of a modified plug unit, with the parts shown separated.
FIG. 17 is an enlarged partial end view of the stand off member of FIG. 16, on the lines 17—17 of FIG. 16.
Figure 18:
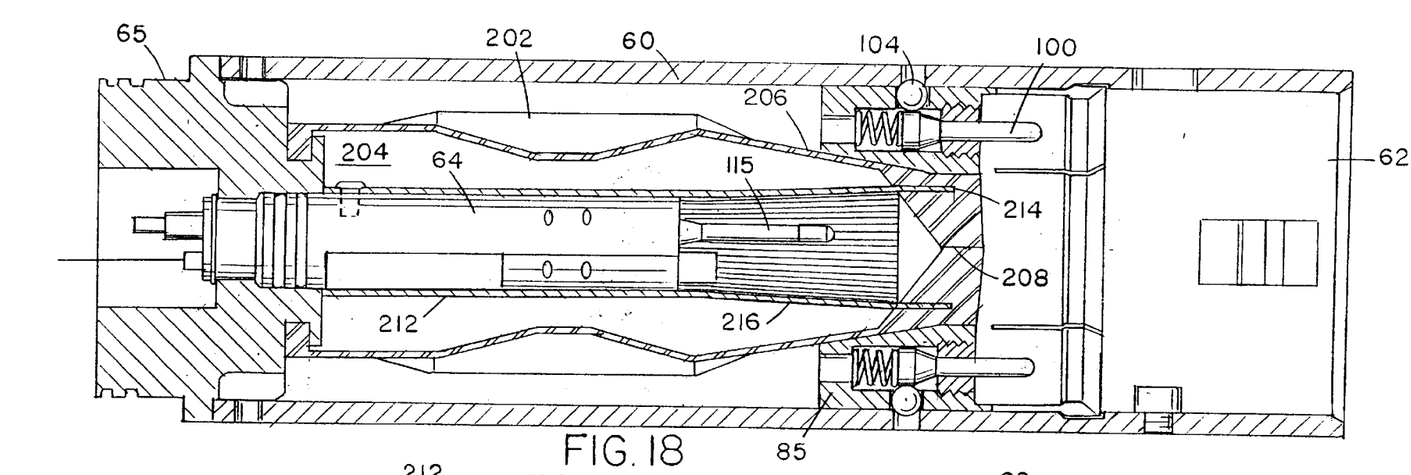
FIG. 18 is a sectional view of the assembled plug unit.
Figure 19:
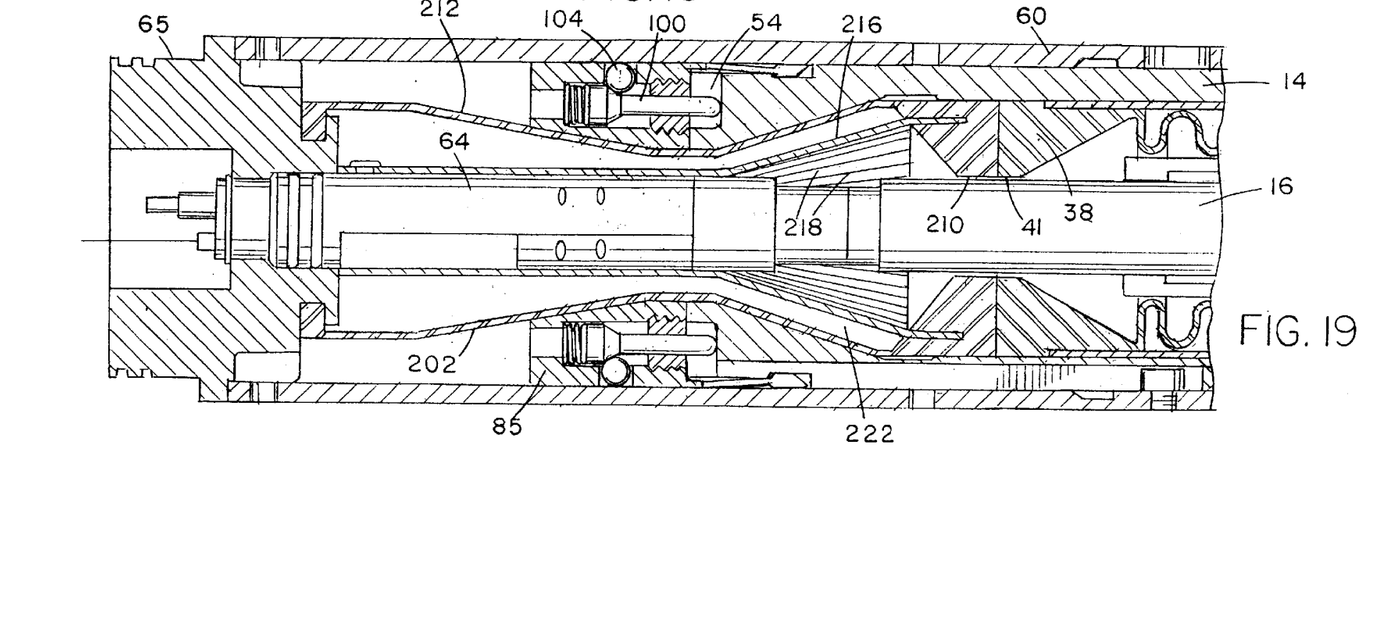
FIG. 19 is a sectional view of the plug unit of FIGS. 16 to 18 connected to the receptacle unit.

The forward or end seal portion 206 of the bladder engages in a throat 84 in a slidably mounted throat member 85 in the plug shell bore 62, as in the previous embodiment. The throat member 85 is releasably locked in the extended position by a ball locking assembly 86, exactly as described above in connection with the first embodiment. When the plug and receptacle units are separate, the end seal portion 206 will be located in the actuator throat and the end opening 208 will be pressed into a sealed, closed condition by the opposing tapered portions of the throat 84.

Rather than an external cover or stand-off 82 as in the previous embodiment of the plug unit, the plug unit 200 has an internal bladder stand-off or sleeve member 212 which extends within chamber 204 from the end wall 65 to the end seal portion 206 of the bladder. The stand-off or sleeve member 212 is of any suitable, axially strong material to resist collapse of the bladder when the plug and receptacle units are connected, and, unlike the external sheath of plug unit 12, does not have to be radially compressible. The rear end of sleeve member 212 is secured in the rear end wall 65 by screws or the like, and the forward end 214 is adhesively bonded in a suitable annular indent 215 formed in the end seal portion 206 of the bladder.

As best illustrated in FIG. 16, the stand-off member is generally cylindrical and has a first portion of uniform diameter, and a forward, outwardly tapering portion 216. A plurality of axially extending, linear slots 218 are formed along most of the length of member 212 up to its forward end 214, as I illustrated in FIGS. 16 and 17. Each slot tapers inwardly from the inner diameter of member 212 to its outer diameter, as indicated in FIG. 17, so that the slots together act as traps for particles in the oil in bladder 202, as will be described in more detail below.

The mating sequence between the plug unit of FIGS. 16 to 18, and the receptacle unit of FIGS. 1 and 3 will be very similar to that described above in connection with FIGS. 1 to 15, and will therefore not be described again in detail. However, it should be noted that, as the units are brought together and the throat 85 is pushed inwardly, throat 85 travels over the outer, compressible bellows portion of the bladder, and not over any external stand-off member, so that any suitably rigid material such as PEEK may be selected for the internal stand-off member 212. Additionally, as the parts are secured together and the bladder 30 in the receptacle unit is compressed, oil will rush from the chamber in the bladder 30 into the plug unit bladder. As the oil rushes into chamber 204, it is forced outwardly through the slots 218, along with any particles which may be contained in the oil. Any particles entering chamber 204 outside stand-off member 212 will tend to be trapped, due to the small exit openings of the slots 218 and the tapered shape which favors travel of particles in an outward direction only. The particles will tend to settle to the lowest regions of chamber 204, in area 222 indicated in FIG. 19, and will therefore be held away from the optical interface. The particle entrapment may be enhanced by adding a few drops of water to the oil which traps particulate material due to it's higher surface tension or by means of a convoluted, "sticky" surface. This arrangement will therefore help to keep the oil in which the optical interface occurs clean and relatively free of particles, even after repeated mating and de-mating of the plug and receptacle units.

The underwater electro-optical connector of this invention is of simple, compact construction and provides for connection of electrical circuits of high voltage and current capacity, as well as connection of a large number of optical fibers, and is therefore particularly suitable for the telecommunications industry. All of the electrical and optical contacts on each side of the connector are sealed in a single, oil-filled chamber and are provided on a single basic core module, considerably simplifying construction and making the plug and receptacle units more compact.

Although an exemplary embodiment of the invention has been described above by way of example only, it will be understood by those skilled in the field that modifications may be made to the disclosed embodiments without departing from the scope of the invention, which is defined by the appended claims.

We claim:

1. An underwater connector, comprising:
   a plug unit having a forward end, a rear end, and a hollow body;
   a first member mounted in the hollow body and forming an internal chamber, the member having a resilient forward end portion having an opening communicating with the internal chamber, at least one contact member mounted in the chamber in alignment with the opening;
   a receptacle unit having a hollow body, a forward end, and a rear end and adapted for mating engagement with the plug unit;
   a second member mounted in the hollow body of the receptacle unit and having an internal chamber and a resilient forward end portion having an opening communicating with the internal chamber, and at least one contact member in the chamber in alignment with the opening;
   the resilient forward end portions of the members having forward end faces in face-to-face sealing engagement when the units are mated together;
   the plug and receptacle units each having an actuator acting in a first, seal closing direction compressing the resilient end portion of the respective member to close and seal the respective opening when the units are unmated, and for permitting opening of the respective openings when the plug and receptacle units are mated together with the end faces in sealing engagement, whereby at least one of the contact members can pass through the aligned openings in the resilient end portions of the members to engage the other contact member; and the openings in the resilient end portions each having an aperture in the respective forward end face which is elongated in a direction transverse to the first, seal closing direction.

2. The connector as claimed in claim 1, wherein each aperture is eye-shaped.

3. The connector as claimed in claim 1, wherein the forward sealing faces are convex.

4. The connector as claimed in claim 1, wherein each actuator comprises a rigid, shaped throat having a forward end facing the opposing actuator as the units are mated together, each shaped throat having opposing, inwardly tapering portions extending up to the forward end for squeezing corresponding opposing portions of the opening of the respective forward end portion inwardly to close and seal the opening when the units are unmated.

5. The connector as claimed in claim 4, wherein the forward end of each shaped throat has an oval, slot-shaped end opening having a first, wider dimension along the length of the slot-shaped opening and a second, narrower dimension across the width of the slot-shaped opening, the narrower dimension being of predetermined size to squeeze the opening in the respective sleeve end portion into a closed and sealed condition.

6. The connector as claimed in claim 1, wherein the actuator in the plug unit is slidably mounted in the body of the plug unit and is movable between an extended position in which it engages the respective end portion to squeeze the opening shut, and a retracted position in which it is pushed back over the end portion to allow the opening to open.

7. The connector as claimed in claim 6 including a seat slidably mounted in the other receptacle unit, the second member being mounted on said seat for movement between an extended position in which the resilient end portion is engaged in the actuator and the opening is squeezed shut, and a retracted position in which the resilient end portion is retracted from the actuator and allowed to open, the respective slidable actuator and second member moving into their retracted positions when the units are mated together.

8. The connector as claimed in claim 7, including a return device on said plug unit for engaging said sliding seat when the units are mated together and comprising means for returning said seat and second member to the extended, sealed position when the units are separated.

9. The connector as claimed in claim 8, wherein the receptacle body has an axial slot, the sliding seat has a pin projecting radially outwardly through said slot, and the plug body has an inwardly directed resilient member for engaging in said slot behind said pin when said units are mated together, said resilient member comprising said return device.

10. The connector as claimed in claim 6, including a latch assembly on said plug body for releasably latching said plug unit actuator in said extended position when the units are unmated.

11. The connector as claimed in claim 10, wherein the plug unit actuator and the receptacle body have front end faces which engage when the units are mated together, the plug body and actuator having aligned radial bores, the latch assembly including at least one spring loaded pin projecting outwardly from said actuator front end face for engaging the front end face of the receptacle body, and a latch member extending through said aligned latch bores in said extended position of said actuator to prevent axial or rotational movement of said actuator, whereby engagement of the front end face of the receptacle body with said pin as said units are mated urges said pin inwardly and releases said latch member to move inwardly out of the latch bore in said plug body, permitting movement of said actuator from said extended position to said retracted position.

12. The connector as claimed in claim 11, wherein said plug body and actuator have a first pair of aligned radial bores and a second pair of aligned radial bores diametrically opposite said first pair, and said latch assembly comprises a pair of diametrically spaced pins on opposite sides of said first member movable between an extended position projecting outwardly from the front end face of said actuator and a retracted position retracted into said actuator, and a pair of latch members movably mounted in the respective pair of aligned bores, each latch member being urged outwardly by the respective pin to project into the aligned bore in the plug body when the pins are in the extended position, and being free to drop inwardly out of the respective bore in the plug body when the pins are urged inwardly into their retracted positions by the front end face of said receptacle body as the units are mated together.

13. The connector as claimed in claim 12, wherein said latch members comprise balls.

14. The connector as claimed in claim 1, wherein each contact member has a plurality of electrical and optical contacts for engagement with corresponding contacts on the other contact member.

15. An underwater connector, comprising:

a plug unit having an open forward end, a closed rear end wall, and a bore extending from the rear end to the open forward end;

a first bladder member mounted in the plug bore and extending from the rear end towards the open front end of the plug unit, the bladder member having an expandible bellows portion defining a first internal, oil-filled chamber and a resilient forward end portion having a front end face and a passageway connecting the front end face to the first chamber;

a first contact module having a rear end secured to the rear end wall of the plug unit and projecting forwardly within the bladder member into said oil filled chamber in alignment with said passageway, the contact module having a front end having a plurality of electrical and optical contacts;

a receptacle unit having a forward end, a rear end wall, and a bore extending from said rear end wall to said forward end, and adapted for releasable mating engagement with said plug unit;

a second bladder member mounted in the bore and having a second internal, oil-filled chamber and a resilient forward end portion having a front end face for sealing engagement with the front end face of the first bladder member when the units are mated, the forward end portion having a passageway connecting the front end face to the second chamber;

a second contact module having a rear end secured to the rear end wall of the receptacle unit and a front end, the second contact module projecting forwardly into said second bladder member with the front end in said second oil-filled chamber, the front end having a plurality of electrical and optical contacts for contact with corresponding electrical and optical contacts at the front end of the first module when the units are mated together;

the plug and receptacle units each having an actuator for compressing the resilient end portion of the respective bladder member to close and seal the respective passageway when the units are unmated, and for permitting opening of the respective passageways when the units are mated together with the front end faces of the bladder members in sealing engagement, whereby at least one of the contact modules can pass through the aligned passageways into the chamber containing the front end of the other contact module until the front ends of the respective modules are in contact engagement.

16. The connector as claimed in claim 15, wherein the plug unit actuator is movable in said bore between an extended position in which the actuator compresses and seals the passageway in the forward end portion of the first bladder member, and a retracted position in which the forward end portion is allowed to open, and the forward end portion of said second bladder member is movable in said receptacle unit between an extended position in which it is located in the receptacle unit actuator and said passageway is sealed shut, and a retracted position in which it is retracted rearwardly from said actuator and said passageway is allowed to open, whereby as said units are mated together, the forward end of said receptacle unit enters the plug unit bore and urges said plug unit actuator rearwardly to said retracted position, and the forward end of the first bladder member engages the forward end of said second bladder member to urge the forward end portion rearwardly into said retracted position, whereby the second contact module travels through the aligned passageways in the forward end portions of said second and first bladder members, respectively, and into mating engagement with the front end of said first contact module.

17. The connector as claimed in claim 16, including a sliding seat slidably mounted in said receptacle unit bore and having a through bore, the second bladder member having a rear end secured to said sliding seat, and a third oil-filled bladder member having a rear end secured to said rear end wall of said receptacle unit and a forward end secured to said sliding seat, the sliding seat being urged rearwardly between an extended position and a retracted position when said units are mated together, the second contact module extending from said rear end wall through said third bladder member and seat and into said second bladder member.

18. The connector as claimed in claim 17, including a return device on said plug unit for engaging said sliding seat when the units are mated together, the return device comprising means for moving said sliding seat and second bladder member back to the extended position when said units are unmated.

19. The connector as claimed in claim 17, including a biasing spring within said third bladder member extending between said rear end wall and sliding seat for biasing said sliding seat towards said extended position.

20. The connector as claimed in claim 15, wherein the electrical contacts on one of said modules comprise at least two electrical sockets, and the electrical contacts on the other module comprise at least two conductive probes for engagement in said sockets when the units are mated together, the electrical contacts being provided on one side of the respective forward end of the modules.

21. The connector as claimed in claim 20, wherein the module having said electrical sockets has at least two sealable openings in said front end, an annular seal member mounted in each sealable opening and each electrical socket being aligned and in communication with said seal member and spaced rearwardly from said seal member, a resiliently biased stopper of non-conductive material movably disposed and sealably engaged within the annular seal member when the units are not mated, each conductive probe being adapted for insertion through the respective annular seal member to urge the stopper rearwardly and engage in the electrical socket when the units are mated together.

22. The connector as claimed in claim 20, including an optical ribbon connector having a first contact ferrule mounted at the front end of the first module and a second contact ferrule mounted at the front end of the second module, the ferrules being mounted on the opposite side to said electrical sockets and probes, respectively, a first optical fiber ribbon extending from the first contact ferrule through said first module and a second optical fiber ribbon extending from said second contact ferrule through said second module, the fiber ribbons being unrestrained in said respective oil-filled chambers along at least part of their length.

23. The connector as claimed in claim 16, including a hollow stand-off member of rigid material extending in said first chamber from said rear end wall to said forward end portion for resisting collapse of said first bladder member when said units are mated together.

24. The connector as claimed in claim 23, wherein said stand-off member has a plurality of axially extending slots for oil communication in said chamber between the inside and outside of said stand-off member.

25. The connector as claimed in claim 24, wherein said stand-off member has an inner surface and an outer surface, and each slot has a cross-sectional width which decreases between the inner surface and outer surface of said stand-off member.

26. An underwater connector, comprising:

a plug unit having a forward end, a rear end, and a hollow body;

a first member mounted in the hollow body and forming an internal chamber, the member having a resilient forward end portion having an opening communicating with the internal chamber, at least one contact member mounted in the chamber in alignment with the opening;

a receptacle unit having a hollow body, a forward end, and a rear end and adapted for mating engagement with the plug unit;

a second member mounted in the hollow body of the receptacle unit and having an internal chamber and a resilient forward end portion having an opening communicating with the internal chamber, and at least one contact member in the chamber in alignment with the opening;

the resilient forward end portions of the members having forward end faces in face-to-face sealing engagement when the units are mated together;

the plug and receptacle units each having an actuator acting in a first, seal closing direction compressing the resilient end portion of the respective member to close and seal the respective opening when the units are unmated, and for permitting opening of the respective openings when the plug and receptacle units are mated together with the end faces in sealing engagement, whereby at least one of the contact members can pass through the aligned openings in the resilient end portions of the members to engage the other contact member; and the openings in the resilient end portions each having an aperture of non-circular shape in the respective forward end face, the aperture being of predetermined shape comprising means for reducing internal stress in the resilient end portion when the opening is sealed shut.

* * * * *